UNITED STATES PATENT OFFICE.

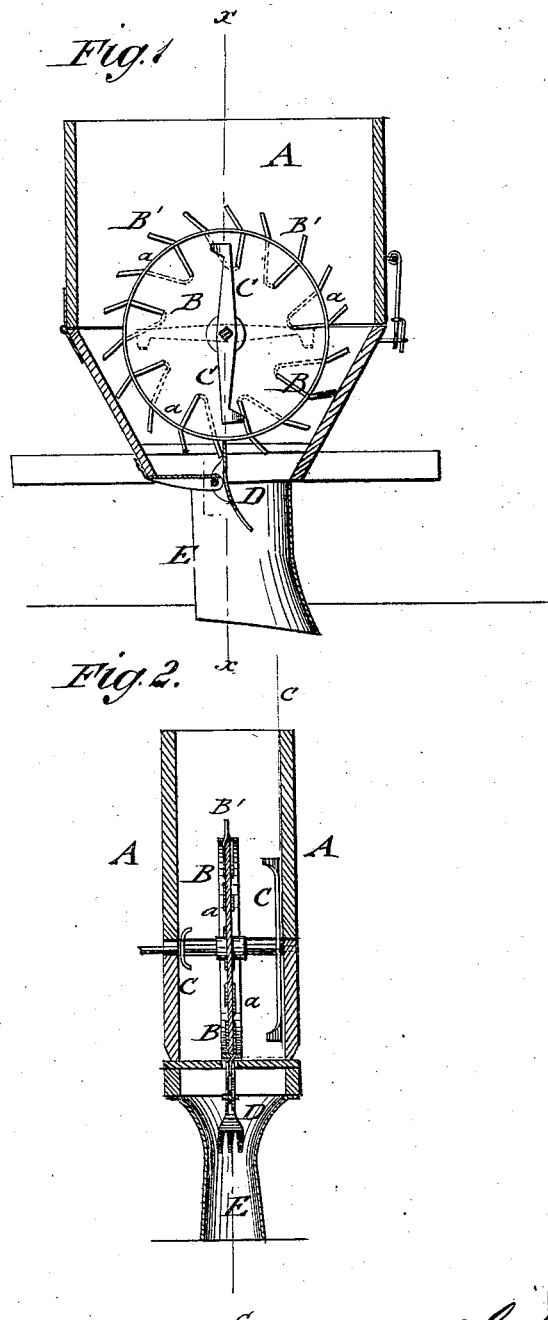

HENRY STECKLER, JR., OF NEW IBERIA, ASSIGNOR TO HIMSELF AND RICHARD FROTSCHER, OF NEW ORLEANS, LOUISIANA.

IMPROVEMENT IN COTTON-SEED DRILLS.

Specification forming part of Letters Patent No. 183,431, dated October 17, 1876; application filed August 7, 1876.

*To all whom it may concern:*

Be it known that I, HENRY STECKLER, Jr., of New Iberia, in the parish of Iberia and State of Louisiana, have invented a new and Improved Cotton-Seed Drill, of which the following is a specification:

In the accompanying drawing, Figure 1 represents a vertical longitudinal section of my improved cotton-seed drill, taken on line *c c*, Fig. 2, and Fig. 2 is a vertical transverse section of the same on line *x x*, Fig. 1.

Similar letters of reference indicate corresponding parts.

My invention relates to improvements in cotton-seed drills, so that the seed is thoroughly agitated and dropped free of lint, without forming lumps or bunches, the dropping-wheel being so constructed that it can be repaired with great facility by any one.

The invention consists of a dropping-wheel that is provided with a series of holes at some distance from its periphery, and a perforated rim, through which V-shaped wires are passed that serve to stir up the seed in connection with radial side stirrers, dropping the same on an oscillating fork, pivoted below the opening of the seed-receptacle, to be conducted by the funnel-shaped opener or plow to the ground.

In the drawing, A represents the seed-box or receptacle, provided with a hinged cover that is locked by suitable mechanism. The dropping-wheel B is made of a cast-iron disk, keyed to a lateral shaft that is revolved by suitable gearing in bearings of the seed-box. The wheel B is perforated at some distance from its periphery, and provided with a perforated rim, *a*, of greater width than the wheel. Wire pieces B' are bent into V shape, preferably of annealed wire, so as to bend but not break. The wires B' are passed through the perforations of the wheel, and one end of the same through a perforation of the rim on one side of the wheel, the other end through the adjoining perforation of the rim, but at the other side of the wheel. The holes in the rim are made large to give to the projecting teeth sufficient play for agitating the seed. The teeth may be readily put in, in case of breaking, without sending the drill to the repair shop. At both ends of the wheel-shaft, near the walls of the seed-box, are arranged fixed arms C, with curved ends that serve to throw the seed toward the wheel in the center of the box. The seed drops through a longitudinal center slot at the bottom of the box on a pivoted lever-fork, D, that is oscillated by the contact of its upper end with the projecting wires of the wheel. The upper end of the lever-fork D serves to rake off the seed that hangs on to the teeth, so as to avoid the gathering and falling of the seed in lumps. It also rakes off the lint adhering to the teeth of the wheel. The lower end of the lever D is made of fork shape, and serves to shake up the seed that drops thereon more or less in lumps and bunches, so as to drop it separately to the ground. An opener or plow, E, with funnel-shaped upper part and open at the rear, takes up the seed so separated and conducts it into the furrow formed by the lower part of the plow that enters into the ground. The plow part being open at the rear admits the watching of the drill by the operator, who can readily see any interruption in the dropping of the seed.

The seed is thus in simple manner agitated and dropped in separated state into the ground, forming a reliable and effective drill for planting cotton-seed.

Having thus described my invention, I claim as new and desire to secure by Letters Patent—

1. In a cotton-seed drill, a dropping-wheel, having a series of perforations at some distance from the circumference, and a perforated rim, in connection with wires passed through a hole of the wheel, and at alternate sides of the wheel through adjoining holes of the rim, substantially as and for the purpose set forth.

2. The combination of a dropping-wheel, having projecting wires, with an oscillating lever-fork, to drop seed separately, as specified.

3. The combination of a dropping-wheel, having projecting wires, an oscillating lever-fork below the same, and an opener or plow, having funnel-shaped top part and open rear part, substantially as described.

HENRY STECKLER, JR.

Witnesses:
 ALFONSE BREAUX,
 STYENE INDICE.